UNITED STATES PATENT OFFICE.

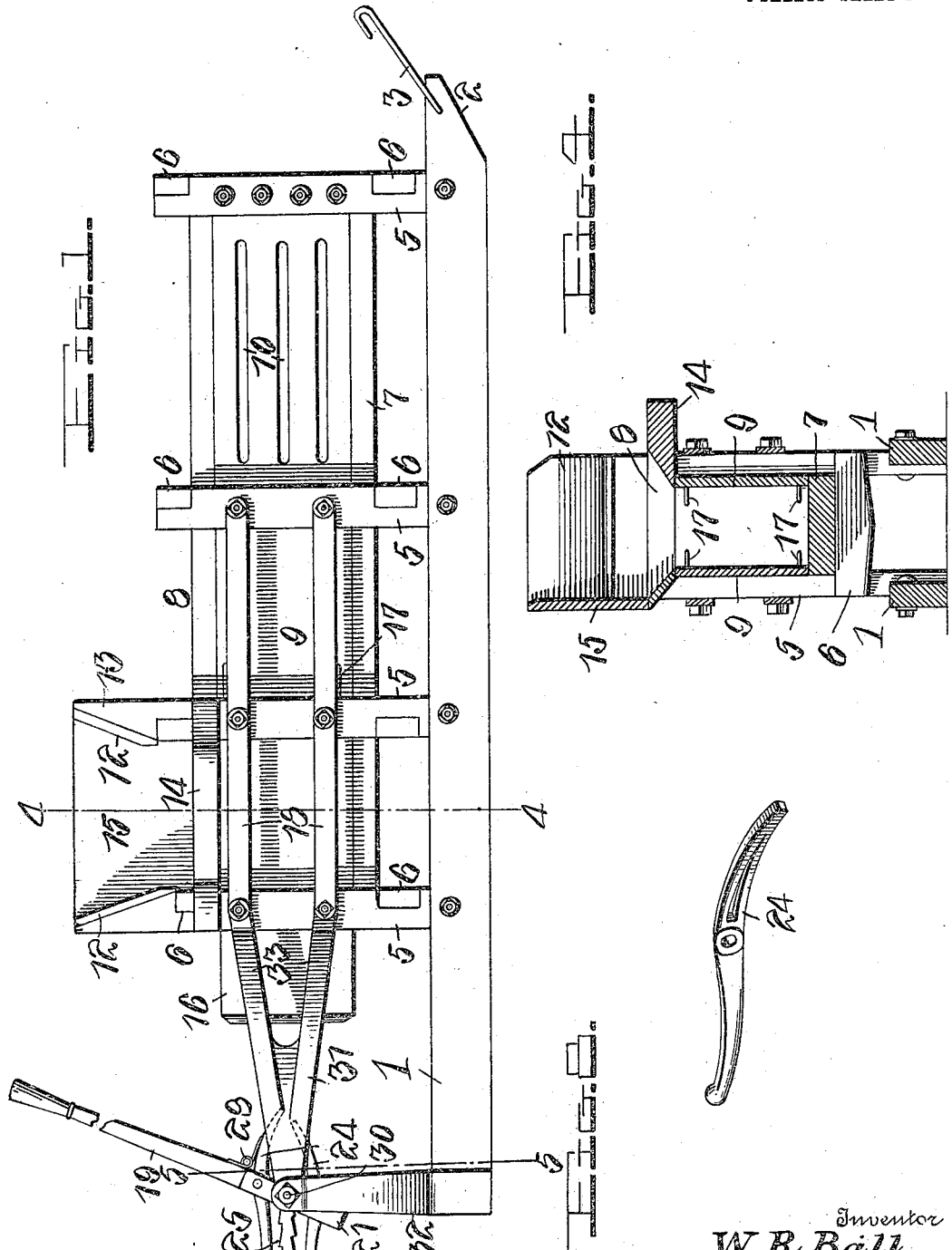

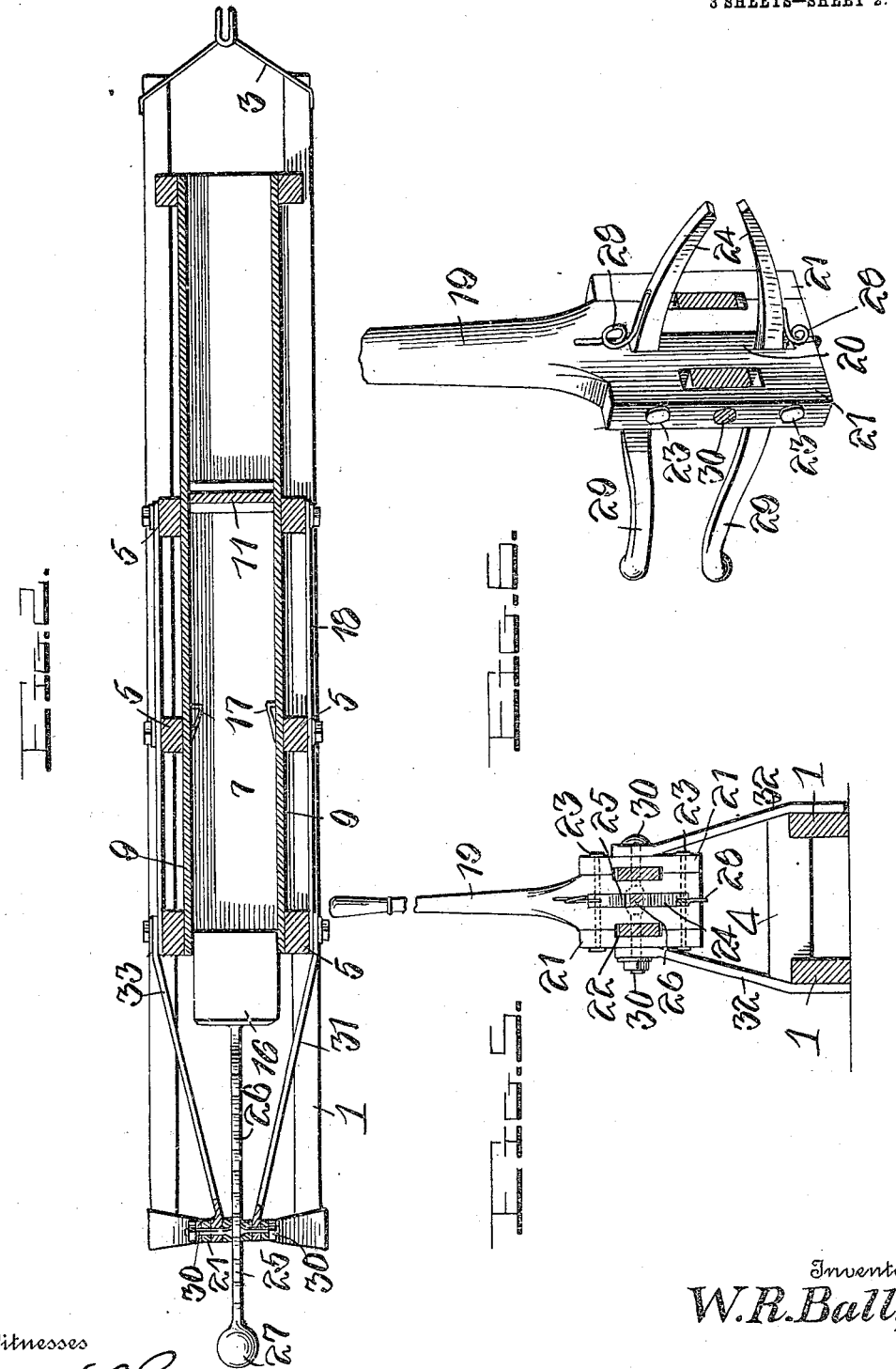

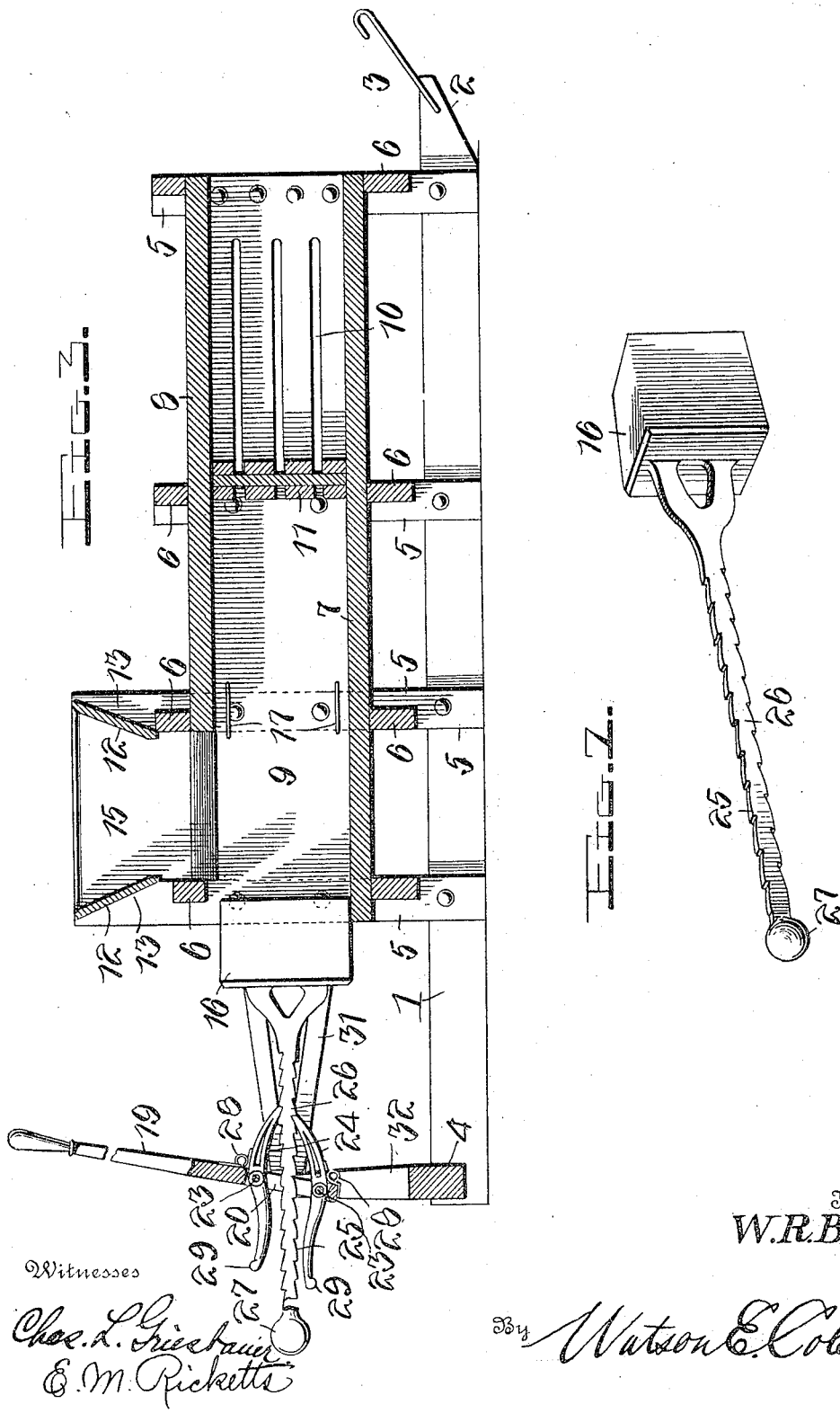

WILLIAM ROSSEM BALL, OF BRYAN, TEXAS.

BALING-PRESS.

961,998.  Specification of Letters Patent.  Patented June 21, 1910.

Application filed March 2, 1910. Serial No. 546,849.

*To all whom it may concern:*

Be it known that I, WILLIAM ROSSEM BALL, a citizen of the United States, residing at Bryan, in the county of Brazos and State of Texas, have invented certain new and useful Improvements in Baling-Presses, of which the following is a specification, reference being had to the accompanying drawings.

My invention relates to improvements in pressers for baling hay and similar commodities.

The object of the invention is to provide a simple, strong and durable press of this character which may be produced at a small cost and which has an improved plunger actuating means whereby the press may be operated by manual power.

With the above and other objects in view, the invention consists of the novel construction, combination and arrangement of parts, hereinafter fully described and claimed, and illustrated in the accompanying drawings in which:—

Figure 1 is a side elevation of my improved baling press; Fig. 2 is a horizontal section; Fig. 3 is a vertical longitudinal section; Figs. 4 and 5 are vertical cross sections taken respectively on the lines 4—4 and 5—5 in Fig. 1; and Fig. 6 is a perspective view of the lever. Fig. 7 is a perspective view of the press plunger and its ratchet bar; and Fig. 8 is a perspective view of one of the pawls or dogs.

Referring more particularly to the drawings 1 denotes two side sills or runners which may have beveled portions 2 at one end and a swinging bail or draft device 3 to which animals may be attached for drawing the press from place to place. The opposite ends of the runners 1 are united by a cross bar 4, and to their intermediate portions are secured a plurality of pairs of upright posts 5 united by upper and lower cross bars 6, between which latter and the posts is secured the press box or body. The body of the press comprises a bottom 7 resting on the lower cross bars or beams 6, a top 8 secured beneath the upper cross bars 6 and two side walls 9, the parts 7, 8, 9, forming a baling chamber. The side walls 9 at the discharge end of the chamber are formed with the usual longitudinal slots 10 so that the bales may be wired, the usual grooved division blocks or heads 11 being placed between the bales as is customary. At the top of the other end of the press box or body is a hopper open at its top and on one side and formed by outwardly flaring side members 12 united to the extended beveled upper ends 13 of the four posts nearest one end of the press box. At the open side of the hopper is a horizontally disposed supporting member or platform 14 and the wall of the hopper opposite the latter is formed by an upright member 15 which unites the extended upper ends 13 of adjacent posts on one side of the device. A reciprocatory plunger 16 is arranged in the press box to reciprocate beneath the hopper, and in order to prevent the hay, straw or the like from being drawn back with the plunger when the latter is retracted, the usual spring retaining members 17 are arranged in the side walls 9 of the press box. The several parts of the press above described are constructed of wood and securely united by bolts so that the device may be produced at a small cost and will be strong and durable. To strengthen the body or box I preferably provide on the outer sides of the posts or uprights 5 upper and lower longitudinally extending metallic reinforcing straps 18, which latter are united to the posts by the bolts which fasten the side walls 9 to said posts.

My improved mechanism for actuating the press plunger 16 comprises a vertically disposed hand lever 19 provided in its rectangular shaped lower end with a longitudinal slot 20 and having secured to the opposite sides of said slotted end longitudinal blocks 21, which latter have the central portions of their inner faces recessed to provide between them and the lever, openings or slots 22. The blocks 21 are united to the lever by upper and lower transverse bolts or similar fastenings 23, which latter also pass through the slot 20 in said lever and serve as the pivots for two dogs or pawls 24 which co-act with series of ratchet teeth 25 formed on the opposite edges of a plunger bar 26. This bar 26 projects longitudinally from the center of one end of the plunger 16 and has at its free extremity a handle 27. The pawls 24 have their inner ends beveled to engage the ratchet teeth 25 and they are maintained in engagement with the same by springs 28, their opposite or outer ends being shaped to provide handles 29, which latter when grasped and moved toward each other and against the plunger bar causes the pawls to be retracted from engagement with the same so that the plunger may be retracted. The lever 19 is fulcrumed on two longitudinally alined bolts or similar pivots 30 which pass through the blocks 21, the portions of the lever on opposite sides of its slot 20, horizontal supporting and bracing arms 31 and uprights 32. The uprights 32 have their lower ends secured to the runners 1 and the cross bar 4, and their upper ends are offset in an inward direction to support the outer ends of the pivots 30. The arms 31 are in the form of horizontally disposed brackets each having at one end diverging portions 33 which are secured to certain of the posts 5. The opposite or outer ends of the bracket arms 31 project into the slots 22 of the blocks 21 and support the inner portions of the pivots 30. Owing to the peculiar construction and mounting of the lever and the provision of the pivots 23 of the pawls 24 close to the plunger bar 26 while the handle end of the lever is comparatively long, it will be seen that the press may be manually operated and at the same time will be exceedingly powerful. The peculiar construction and mounting of the lever renders the operating device strong and rigid and at the same time comparatively inexpensive.

In operation, when the pawls 24 are retracted by grasping their handle ends 29 the plunger may be retracted by grasping the handle 27 of its rod 26 and pulling said rod outwardly in a longitudinal direction. When the plunger is thus retracted the pawls are released so that they engage the ratchets 25, and after hay, straw or the like, which is to be baled has been deposited in the hopper in advance of the plunger the lever 19 is oscillated to force said plunger into the bale chamber to form and compress the bale.

Having thus described the invention, what is claimed is:

1. In a baling press, the combination with a supporting structure, a press box and a reciprocatory plunger therein, of a double ratchet bar projecting from the plunger, uprights rising from the supporting structure, bracket arms projecting from the press box, a lever having a central slot to receive the ratchet bar and side slots to receive said bracket arms, said lever having its lower end disposed between said uprights, longitudinally alined pivots for the lever supported by said uprights and said bracket arms, and pawls pivoted in the central slot of the lever to co-act with said double ratchet bar.

2. In a baling press, the combination of side runners connected at one end by a cross bar and at the other end by a draft bail, posts rising from said runners, upper and lower cross bars uniting said posts, a press box supported between said posts and said upper and lower cross bars, longitudinal straps uniting said posts, a hopper at one end of the press box, a reciprocatory plunger in the press box, a double ratchet bar projecting from said plunger, uprights at the ends of said cross bar uniting the runners, bracket arms projecting from certain of said posts, an upright lever having a central slot to receive the double ratchet bar, and side slots to receive said bracket arms, longitudinally alined pivots for the lever and supported by said bracket arms and said uprights, and a spring pressed pivotally mounted box in the central slot of the lever to co-act with said double ratchet bar.

In testimony whereof I hereunto affix my signature in the presence of two witnesses.

WILLIAM ROSSEM BALL.

Witnesses:
K. L. BUCHANAN,
C. E. BULLOCK.